United States Patent [19]
Morris

[11] Patent Number: 5,507,647
[45] Date of Patent: Apr. 16, 1996

[54] SIMULATION DEVICE AND SYSTEM

[75] Inventor: Donald L. Morris, San Carlos, Calif.

[73] Assignee: Magic Edge, Inc., Mountain View, Calif.

[21] Appl. No.: 227,929

[22] Filed: Apr. 15, 1994

Related U.S. Application Data

[63] Continuation of Ser. No. 964,320, Oct. 20, 1992, Pat. No. 5,388,991.
[51] Int. Cl.$^6$ .................................................. A63G 31/00
[52] U.S. Cl. .................. 434/55; 434/34; 434/43; 434/45
[58] Field of Search ............... 434/29, 305, 33–35, 434/37, 43–46, 49, 51, 55, 59, 61–63; 472/27–37, 39, 44, 45

[56] References Cited

U.S. PATENT DOCUMENTS

| | | | |
|---|---|---|---|
| 3,494,052 | 2/1970 | Corlyon | 434/55 |
| 3,618,256 | 11/1971 | Monks | 434/55 |
| 3,984,924 | 10/1976 | Myles et al. | 434/55 |
| 4,527,980 | 7/1985 | Miller | 434/55 |
| 4,584,896 | 4/1986 | Letovsky | 434/55 |
| 4,710,128 | 12/1987 | Wachsmuth et al. | |
| 4,856,771 | 8/1989 | Nelson et al. | |

OTHER PUBLICATIONS

"Odds & Ends," High–Tech Exhilaration, *Air Transport World*, Apr. 1992, p. 136.

*Primary Examiner*—Richard J. Apley
*Assistant Examiner*—Glenn E. Richman
*Attorney, Agent, or Firm*—Skjerven, Morrill, MacPherson, Franklin & Friel; Alan H. MacPherson; Omkar K. Suryadevara

[57] ABSTRACT

A simulator device provides a full 360 degree axial roll to a passenger capsule. This device also provides 70 degrees of pitch to the capsule. The 70 degrees of total range of pitch motion provided by the simulator device creates additional desirable and exciting sensations. For example, if the passenger is quickly rotated from a full pitched back position to a full pitch forward position, the feeling of flying or dropping straight down is simulated. The simulator device provides the passenger with 0.5 Gs pitch forward, 0.25 Gs pitch backward, 0.25 Gs rotational acceleration, and 2.25 Gs vertical acceleration. These forces simulate the motion sensations of high speed looping roller coasters, bobsled rides, water rides, flying rides, and driving rides. The simulator device provides sufficient vertical motion to create more than ½ second of weightlessness. In this manner, the passenger experiences free falls off cliffs, vertical drops down the side of skyscrapers or plunges over Niagara Falls. In one embodiment of the present invention, a visual and audio system provides high resolution images and stereo sound to create realistic sensory experiences.

9 Claims, 12 Drawing Sheets

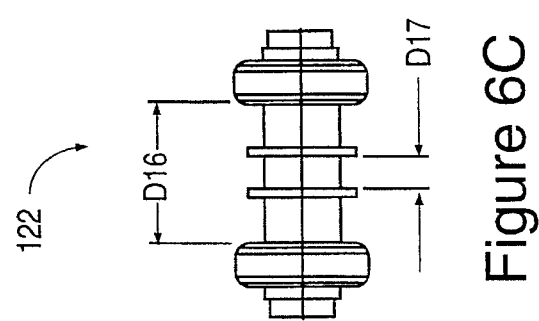
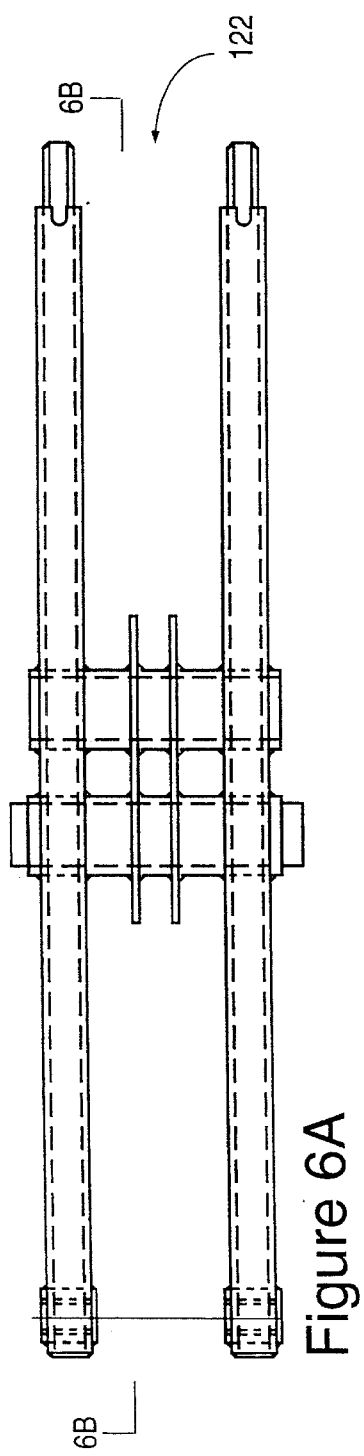
Figure 6A
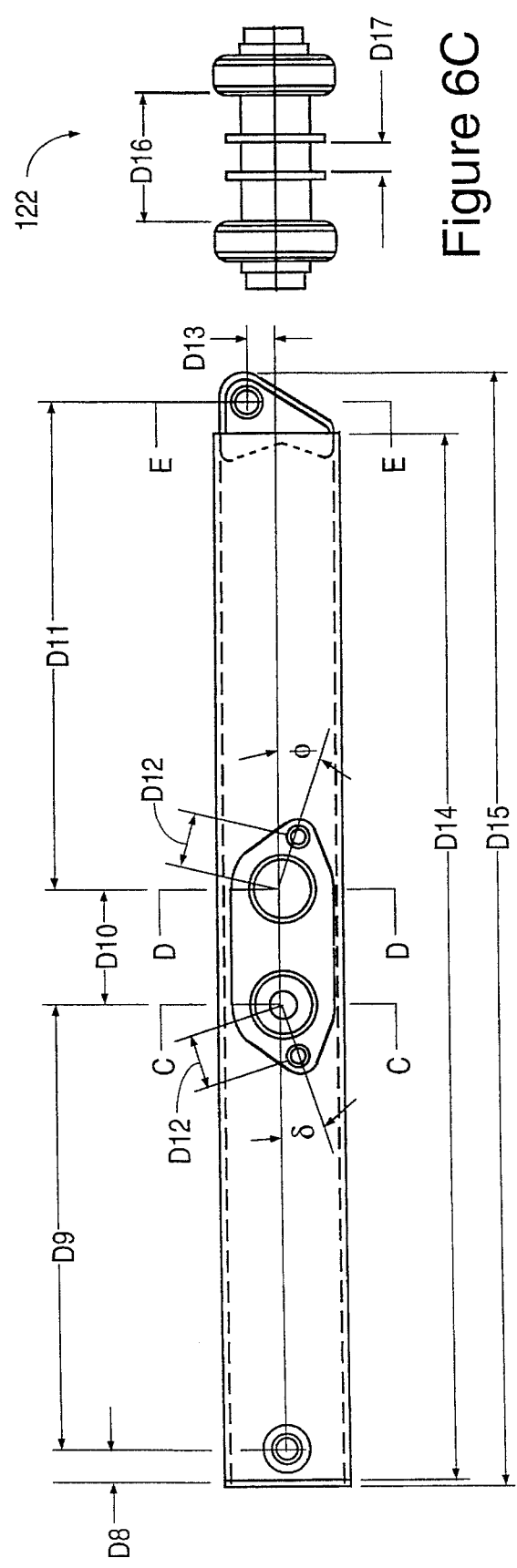
Figure 6B
Figure 6C

SIMULATION DEVICE AND SYSTEM

This application is a continuation of application Ser. No. 07/964,320, filed Oct. 20, 1992, now U.S. Pat. No. 5,388,991.

BACKGROUND OF THE INVENTION

1. Field of the Invention

This invention relates to simulators, and in particular to a device for simulating motions, and a system combining this device with images and sounds to simulate a sensory experience.

2. Description of the Related Art

Roller coasters and other action thrill rides have long been the favorites of amusement park attenders. To appease the ever-increasing demands of the public for more thrilling loops, turns, and anti-gravitational effects, amusement parks continuously search for the latest and most exhilarating rides available. Existing amusement park rides now include simulation technology, originally developed for the military and commercial training market, as well as photorealistic visual effects, surround sound, and synchronized motion to create a simulated ride environment. However, this synchronized motion is significantly limited in pitch (tilt), axial movement (roll), velocity, acceleration, and distance of vertical motion. Specifically, the pitch and the axial movement are limited to the maximum extension of the cylinders and the distance between cylinder coupling points. The velocity is limited to the maximum velocity of the cylinder which is correspondingly limited by the maximum system flowrate of fluid. In a similar manner, the acceleration is also limited to the cylinder acceleration. Finally, the distance of vertical motion is limited to the stroke length of the cylinder. Because of the above-described limitations, the simulated motion of the ride is frequently less "real", thereby lessening the pleasure experienced by the passenger during the ride. Moreover, it logically follows that the limited motion capabilities of present simulators also limit the type of experience capable of being simulated. For example, because present simulators fail to provide full axial movements, rides simulating a roller coaster barrel roll are unavailable.

Therefore, a need arises for a simulation device and system which provides any number of different motions including a full axial roll, as well as increased pitch, velocity, acceleration, and vertical motion capabilities to provide the passenger with a realistic and virtually unlimited sensory experience.

SUMMARY OF THE INVENTION

In accordance with the present invention, a motion simulator provides full axial rotation of a capsule. This motion simulator includes a platform, an arm for elevating the capsule above the platform, and means for rotating the capsule at least 360 degrees on the arm. The means for rotating the capsule includes a shaft coupled to the capsule, a structure for positioning the shaft in operative relation to the arm, and means for providing slipping between the shaft and the structure for positioning the shaft. Full axial rotation of the capsule provides the passenger with the experience of a barrel roll in, for example, a roller coaster or a fighter plane in a dog-fight maneuver.

The motion simulator further provides substantially vertical movement of the capsule. This movement is achieved with a beam coupled to the arm, a compression member and a tension member rotatably coupled to the beam, and an actuator for moving the beam, wherein movement of the beam is limited by the compression member and the tension member. The beam, arm, compression member, and tension member (the four component assembly) provide a linear relationship between the extension of the actuator and the vertical motion of the capsule. In one embodiment, the velocity of the capsule is approximately double the velocity of the actuator, thereby effectively doubling the potential velocity of capsule 100 in comparison with prior art motion simulators. Additionally, this linear relationship ensures optimal cylinder selection while minimizing energy losses in the system. Moreover, the four component assembly provides a low side profile (in a full down position), thereby allowing the motion simulator to be easily hidden using a raised platform.

The motion simulator also provides sufficient vertical motion to create a feeling of weightlessness. This distance of vertical motion is determined by the flow rate of the system which in turn provides the maximum possible vertical velocity. In one embodiment of the present invention, this distance is at least 11 inches. In another embodiment of the present invention, this distance is increased to 40 inches to provide a safety factor. The feeling of weightlessness is simulated by accelerating the capsule to its maximum vertical velocity, decelerating the capsule to zero vertical velocity, dropping the capsule the same distance attained during the deceleration, and then decelerating the capsule. This capability provides the passenger with the experience of free falls off cliffs, vertical drops down the side of skyscrapers, jumps across missing sections of track in a run-away mine car, or plunges over Niagara Falls.

The motion simulator also provides the capability of approximately 70 degrees of pitch. In one embodiment, the passenger experiences a 45 degree upward pitch and a 25 degrees downward pitch. The 70 degrees of total range of pitch motion provided by the present invention creates additional desirable and exciting sensations. For example, if the passenger is quickly rotated from a full pitched back position to a full pitch forward position, the feeling of flying or dropping straight down is simulated.

The motion simulator further provides the passenger with a 0.5 Gs pitch forward, a 0.25 Gs pitch backward, 0.25 Gs rotational acceleration, and 2.25 Gs vertical acceleration. The gravitational forces associated with the rotational and vertical acceleration are provided substantially with the pitch of the capsule. The above-described gravitational forces simulate the motions associated with such rides as high speed looping roller coasters, bobsled rides, water rides, flying rides, and driving rides.

In one embodiment of the present invention, the motion simulator is combined with a visual and audio system to provide the passenger with a complete sensory experience. The visual system in the simulation capsule includes a rear projected screen with a mirror assembly and projector. The visual system provides the images which enhance the simulated experience of the passenger. The mirror system includes either flat mirrors or at least one curved mirror to compress the projected image from the projector. In other embodiments, 3-D viewing is provided with two projectors and polarized lenses. Three dimensional sound is provided by a sound and speaker system which places sounds in the capsule, while correcting for amplitude and Doppler effects.

BRIEF DESCRIPTION OF THE DRAWINGS

FIGS. 6A, 6B, and 6C illustrate a top, side, and end view, respectively, of the main beam of the motion simulator.

DETAILED DESCRIPTION OF THE DRAWINGS

Figure 1:
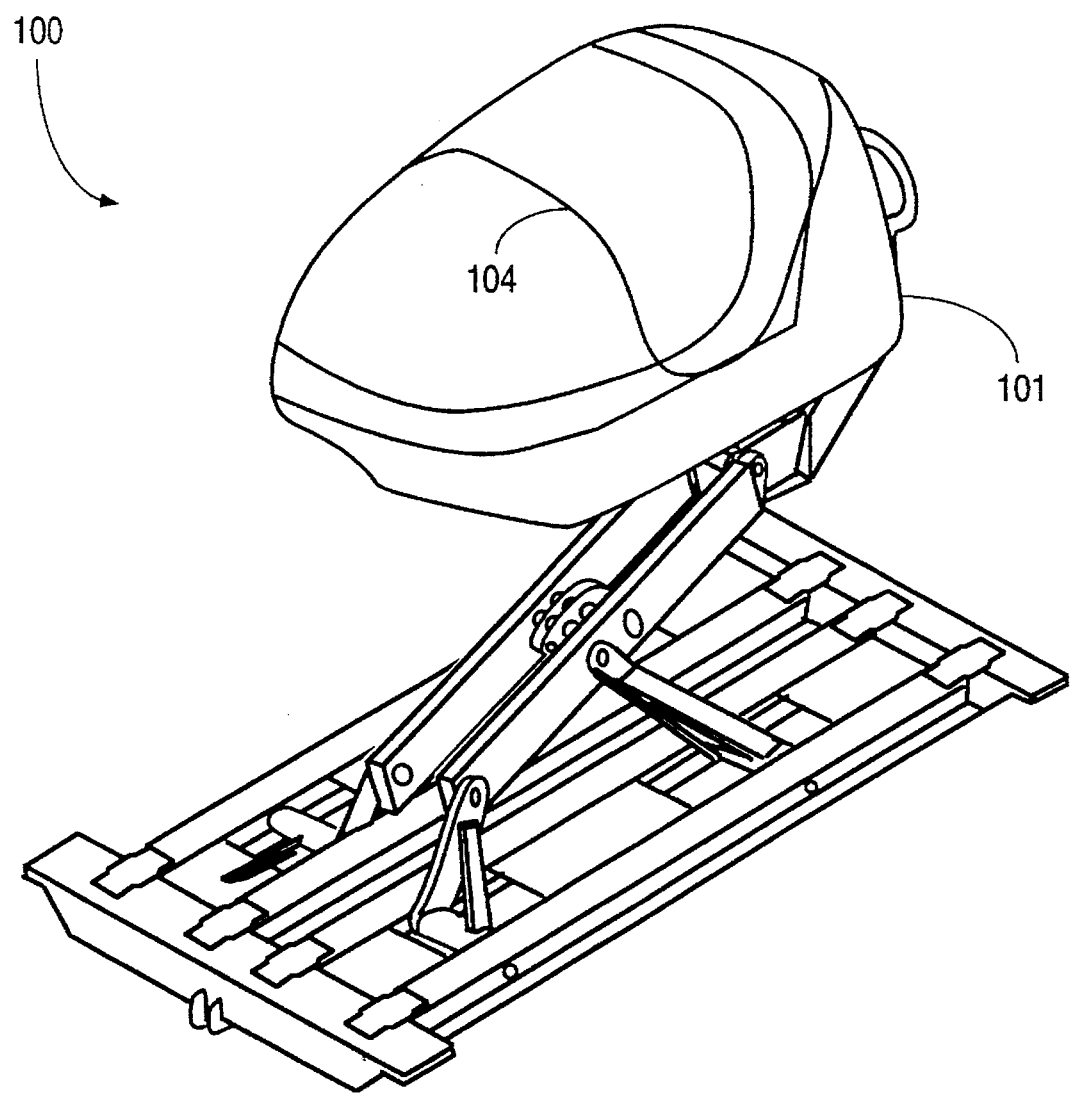
FIG. 1 illustrates a perspective view of a simulator capsule and a motion simulator device in accordance with the present invention.

FIG. 1 illustrates a perspective view of a simulator capsule 100 in accordance with the present invention. The shell 101 of simulator capsule 100 is typically fabricated from lightweight materials, such as fiberglass, graphite, or aluminum. The internal framework (not shown) of capsule 100 is formed from, for example, 4130 Aircraft Structural Round Tubing, MIL-T-6736, Condition N which has 95,000 PSI tensile strength and 75,000 PSI yield strength. Other materials having similar strength to weight characteristics can be used in embodiments of the present invention. The capsule door 104, used for entering and exiting capsule 100, is typically fabricated from an inner and outer shell of fiberglass composite materials, vacuum-formed polycarbonate, or other low density plastic material.

In one embodiment of the present invention, capsule 100 measures 107.5 inches long, 58.5 inches high, and 56 inches wide. The total weight of capsule 100, if fabricated from fiberglass and excluding the weight of the passenger, is approximately 750 pounds.

Figure 2A:
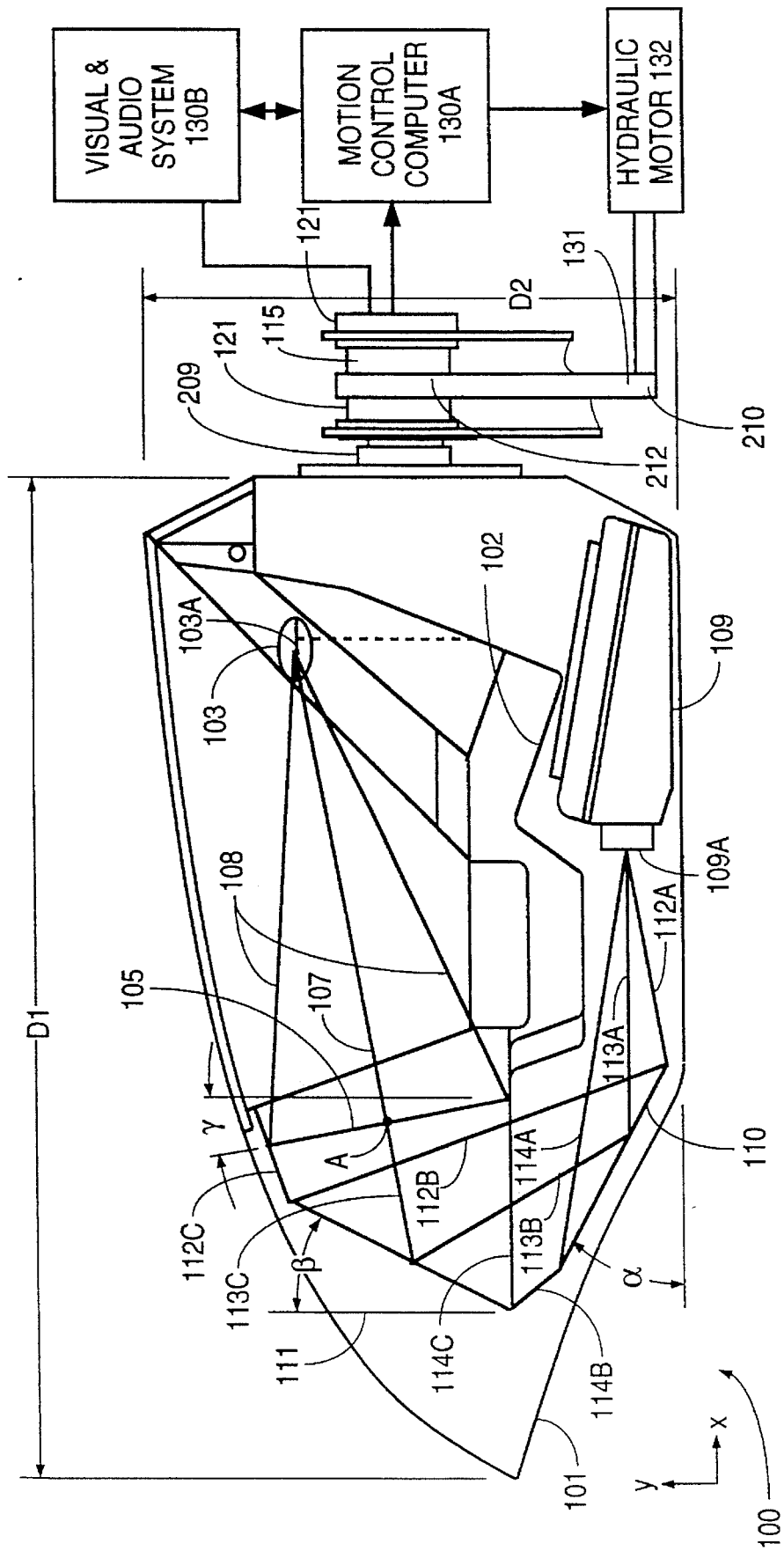
FIG. 2A shows a cross-sectional view of a simulation capsule in accordance with one embodiment of the present invention.

FIG. 2A illustrates a cross-sectional view of capsule 100. In one embodiment, simulator capsule 100 includes a single seat 102 molded of fiberglass and formed integrally with capsule shell 101. Seat 102 conforms to a typical seat in a sports car as defined in the Human Scale ™ Seating Guide by Henry Dreyfuss Associates (1990) which is herein incorporated by reference in its entirety. Other embodiments provide a plurality of seats for multiple riders. Dimensions D1 and D2 in FIG. 2A are listed in Table II.

Figure 2B:
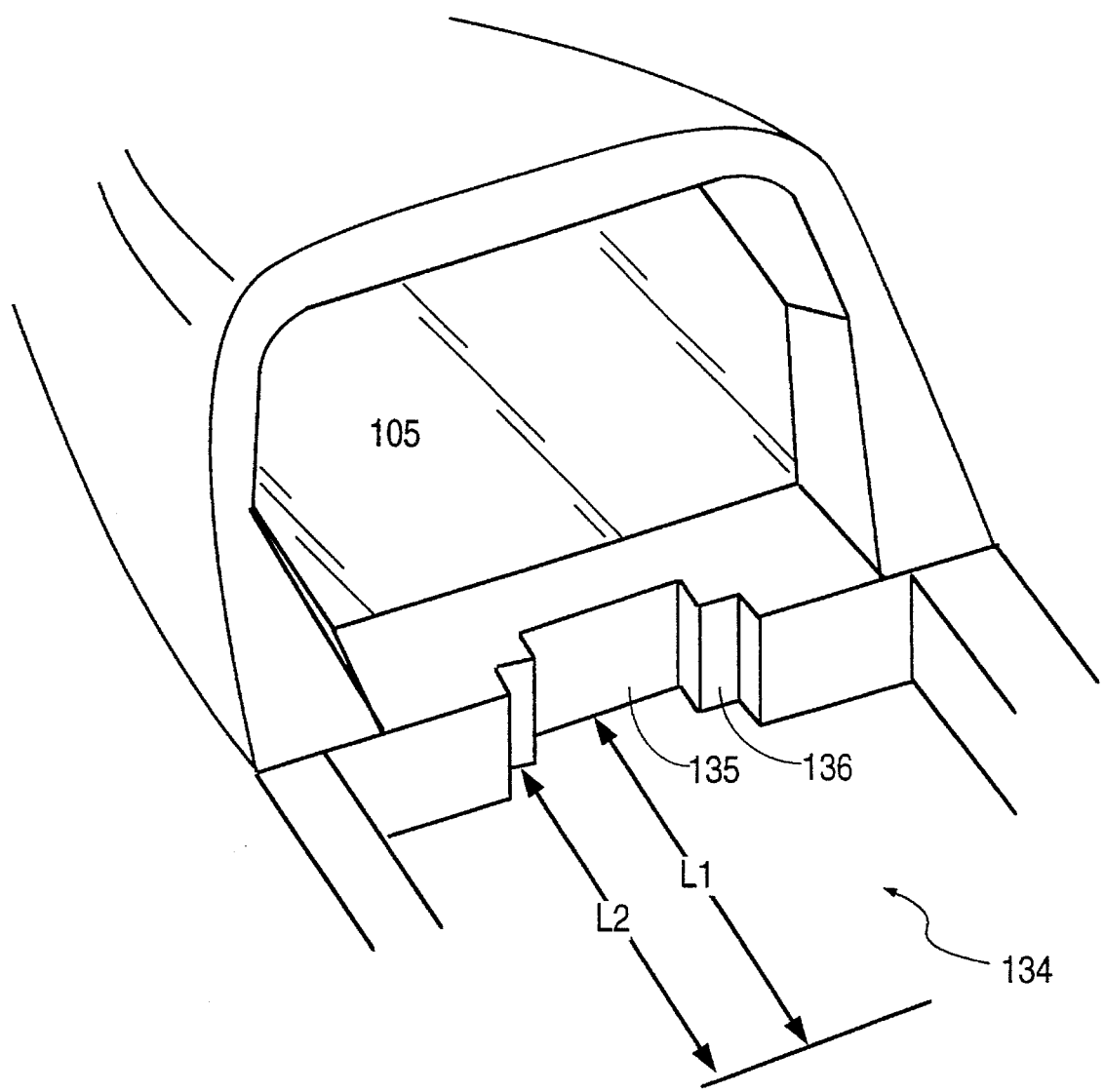
FIG. 2B illustrates a perspective view of an ergonomically-designed stepped foot area inside the capsule which effectively provides appropriate legroom for passengers of varying heights.

In accordance with the present invention and referring to FIG. 2B, capsule 100 provides a stepped foot area 134 to provide comfortable and secure support for the legs of the passenger, irrespective of height. A typical tall passenger, i.e. taller than 6.2" inches (186.96 cm), requires a floor legroom length L1 of 37.5 inches (95.25 cm), as measured horizontally from the intersection of the seat backrest and seat area (neither shown for simplicity). Thus, a tall passenger uses foot rest 135 which is approximately 12 inches (30.48 cm) wide. In contrast, a smaller stature passenger, i.e. less than 4.10" (147.32 cm), requires a floor legroom length L2 of 30.1 inches (76.454 cm). Thus, a passenger of smaller stature uses foot rest 136 to anchor his/her feet. Stepped foot area 134 provides an ergonomic configuration which effectively accommodates all passenger heights. In this manner, the present invention provides a comfortable ride to all passengers, irrespective of height.

A shoulder and lap passenger restraint system (not shown) includes a five-point racing type seat belt harness. In another capsule 100, the passenger restraint system includes a pull-down lap and shoulder restraint system similar to that used on roller coasters. Passenger interactive controls (not shown), such as a joy stick, a throttle, weapons controls, or a steering yoke-or wheel are also typically provided in capsule 100.

To provide photorealistic images to the rider and referring back to FIG. 2A, capsule 100 includes a rear-projected viewing screen 105. If a standard adult (i.e. within a predetermined height range) passenger is sitting in seat 102, an eyellipse 103 is determined. An eyellipse is defined as an area in which the eyes of the passenger are located. Viewing screen 105 is tilted from the y-axis by an angle γ such that the centerline viewpath 107 of the passenger originating in eyellipse 103 is perpendicular to viewing screen 105 and hits the center A of viewing screen 105. In this embodiment, angle γ is 10.5 degrees. A vertical viewing cone 108 of +/– 14.8 degrees from centerline viewpath 107 is provided to minimize passenger claustrophobia within capsule 100. Note that a vertical viewing cone of +/– 15.0 degrees is typically provided in standard cars. The horizontal viewing cone (not shown) is +/– 19.5 degrees from path 107. After the distance from the center 103A of eyellipse 103 to center A of screen 105 is determined, the optimal size of screen 105 is defined by viewing cone 108. In this embodiment, screen 105 is approximately 27 inches high and 36 inches wide. Viewing screen 105 is fabricated from a material sufficiently rigid, such as rear-surfaced polycarbonate, to ensure a stable image inside simulator capsule 100.

A high resolution projector 109, mounted under seat 102, generates the images to be projected onto viewing screen 105. The distance from the projector lens 109A to center A of viewing screen 105 is set to the distance recommended by the projector manufacturer. In this embodiment, projector 109 is a Sony 1271Q having three color guns (red, green, and blue) to generate the high resolution images. The recommended distance from projector lens 109A to center A is 72 inches (182.88 cm).

Other embodiments of the present invention include two projectors (for example the Sharp XG-2000U LCD color video projector) and polarized lenses to provide three-dimensional (3-D) viewing. In this configuration, the light from one of the two projectors is polarized 90 degrees relative to the other projector. The passenger of capsule 100 wears corresponding polarized glasses. In this manner, the projected image from one projector is viewed by the right eye, while the image of the other projector is viewed with the left eye. The viewpoint of one projector is slightly offset in relation to the other projector, thereby creating a 3-D view for the passenger.

An alternative method of producing 3-D viewing uses "shutter glasses". Using these glasses, the view from the right eye is blacked out, while the left eye simultaneously views the projected left eye image. Then, the view from the left eye is blacked out, while the right eye simultaneously views the projected right eye image. This synchronized projection method also produces a 3-D effect.

In a 3-D simulated environment, passengers can pilot through the Grand Canyon, navigate the Great Barrier Reef, or tour the streets of London. In one embodiment of the present invention, the passenger questions and receives answers from a conventional, voice recognition system built into capsule 100. In another embodiment, the passenger points at an animal, rock formation, architectural relic, or painting using a touch pad, and receives an informational response. Thus, the present invention provides important educational functions for students who, by using interactive controls in capsule 100, can direct their learning according to their individual interests and needs. However, the present invention, in addition to providing significant benefits to students, also provides important functions for professionals. For example, in yet another embodiment, surgeons analyze simulated tissue using the 3-D imaging system before performing critical surgery.

To provide the highest possible resolution on screen 105, mirror 110 is angled at least an angle α of 30.0 degrees to the horizontal axis x while mirror 111 is angled is at least an angle β of 24.75 degrees to the vertical axis y such that projected centerline 113 is perpendicular to screen 105 and, like centerline path 107, intersects screen 105 at point A. This perpendicular intersection at point A of both centerline path 107 and projected centerline 113 ensures that the passenger is provided the highest level of intensity from screen 105. Both mirrors, having flat and reflective surfaces, diffract light rays from projector 109 onto viewing screen 105 without distortion. For example, light ray 114A is reflected off mirror 110. The reflected ray 114B is then reflected off mirror 111. Finally, ray 114C is projected onto viewing screen 105. For simplicity, only three light rays, 112A, 113A, and 114A, are shown emanating from projector 109.

Figure 2C:
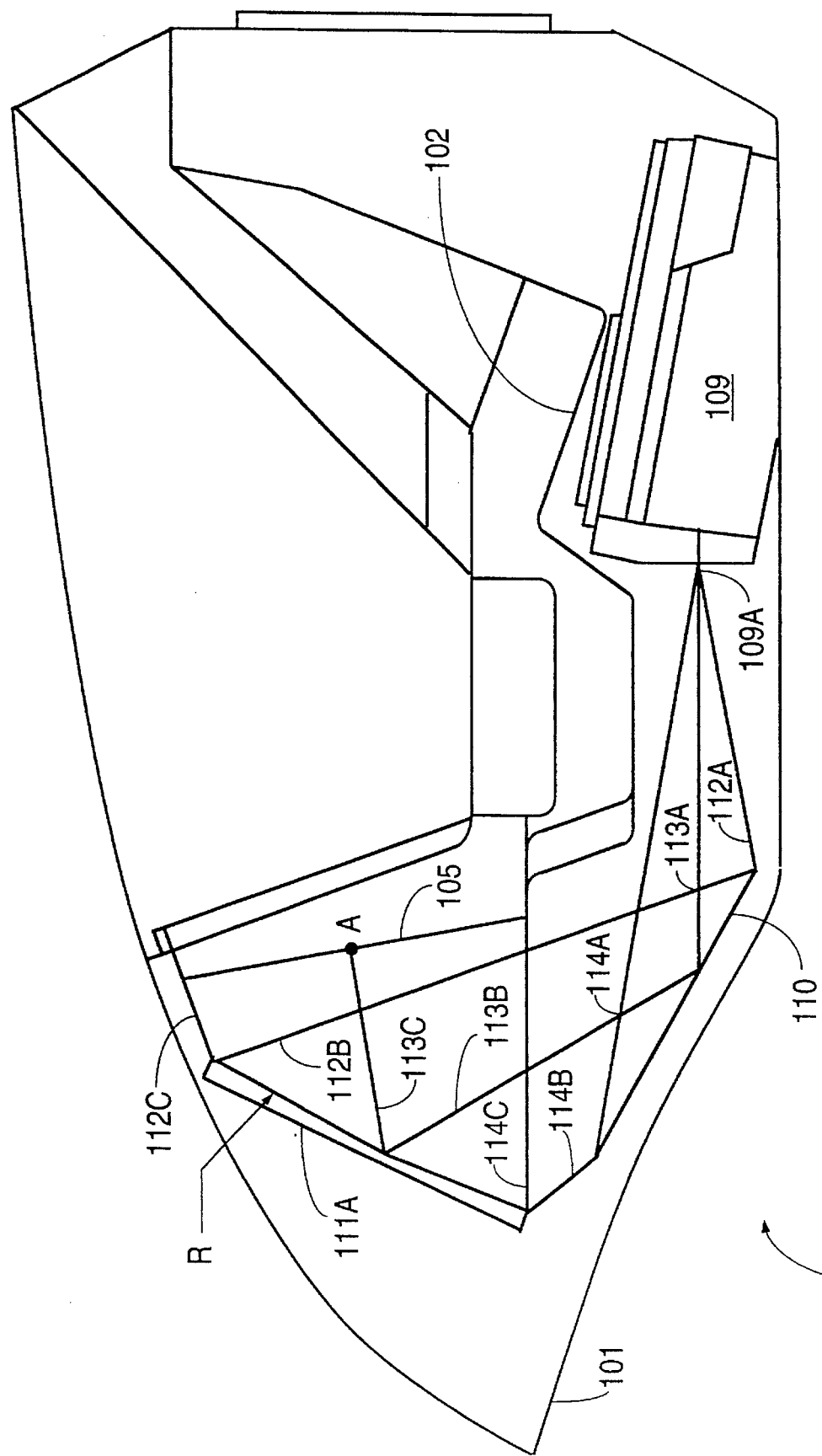
FIG. 2C illustrates another cross-sectional view of a simulation capsule in which a curved mirror compresses a projected image onto the viewing screen.

In another embodiment of the present invention and referring to FIG. 2C, curved mirror 111A, having a radius R of approximately 100 inches, vertically compresses the image from projector 109. Using this configuration, a projected image with a 4 wide by 3 high aspect ratio is compressed to a 16 wide by 9 high aspect ratio on screen 105. In this manner, a less expensive 4 wide by 3 high aspect ratio projector efficiently projects onto a wide aspect ratio screen. In this embodiment of the present invention, screen 105 is 48 inches wide by 27 inches high.

Referring again to FIG. 2A, to ensure that mirrors 110 and 111 are lightweight and stable, one embodiment of the present invention uses mirrors fabricated from laminated foam core. The laminated foam core includes a 1 inch (2.54 cm) layer of 4 pound per cubic foot urethane foam sandwiched between two, 0.25 inch (0.635 cm) thick sheets of acrylic. One of these two acrylic sheets has a front surface mirror. The acrylic/foam/acrylic laminate forms a stiff beam structural element which provides rigidity to mirrors 110 and 111 and prevents oscillation and warping of the mirrors under high stress ride conditions, such as during high accelerations and vibrations of capsule 100. Both mirrors 110 and 111 are configured to the interior shape of capsule 100.

Visual and audio system 130B, which generates the images and sounds for capsule 100, interfaces with the motion control computer 130A to provide the passenger with an enhanced sensory experience. In one embodiment of the present invention, the 3-D sound for capsule 100 is provided by an AudioWorks ™ sound system purchased from Paradigm Simulation, Inc. (located at 15280 Addison Road, Suite 120, Dallas, Tex. 75248) which drives a conventional four speaker system from Polk Audio (located at 5601 Metro Drive, Baltimore, Md. 21215). The AudioWorks ™ sound system takes digital positioning information directly from a Silicon Graphics Reality Engine simulation computer (Silicon Graphics, Inc. is located at 2011 North Shoreline Blvd., Mountain View, Calif. 94039–7311) and places these sounds in the 3-D space surrounding the passenger, correcting for both amplitude and Doppler effects.

Interior air flow is provided and controlled by a conventional air flow/conditioning system. Conditioned air is supplied through a hollow axial rotation tube 115 (FIG. 2A) which attaches capsule 100 to the motion mechanism (described in detail below), thereby providing a constant flow of air into capsule 100 independent of capsule rotation. Power, video, audio, and control signals enter the capsule through a slip ring assembly (not shown) (manufactured by Electro-Tech, Inc., 1501 North Main Street, Blacksburg, Va. 24060) which is located at the axial rotation point (explained in detail below).

Figure 3A:
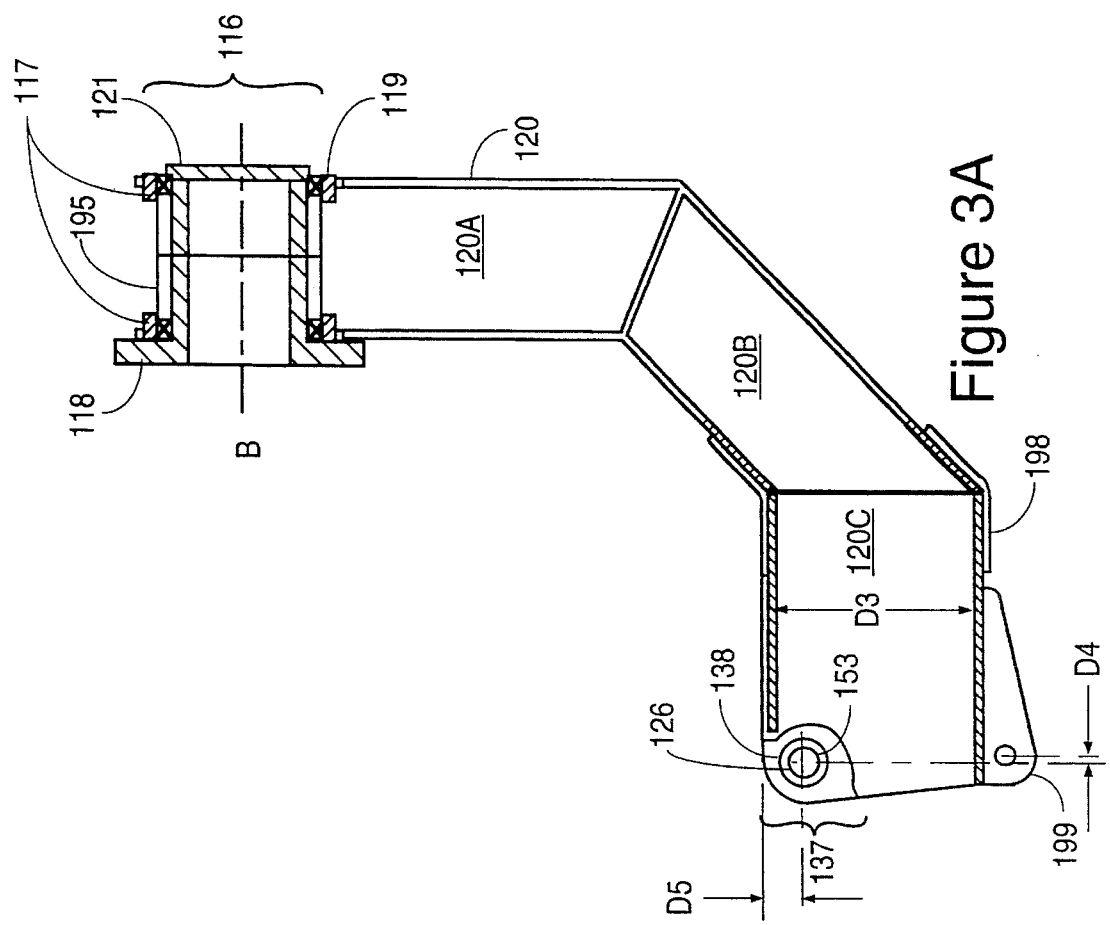
FIGS. 3A and 3B show a side view and an end view, respectively, of the rotation bearing assembly and the pitch arm.
Figure 3B:
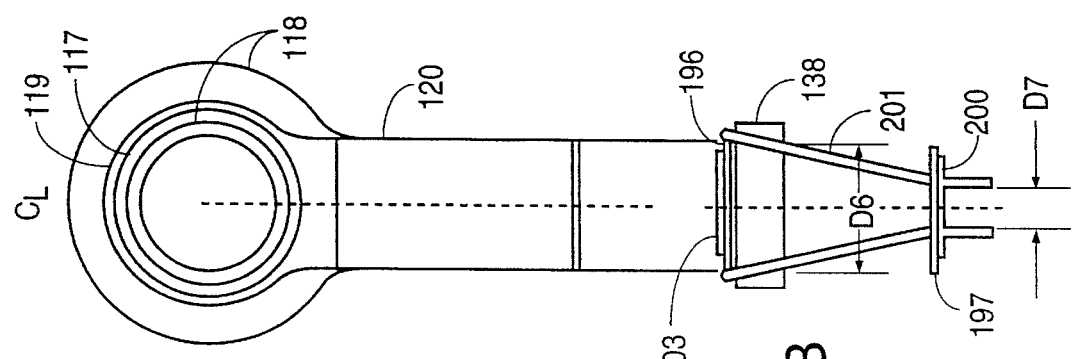
Figure 4A:
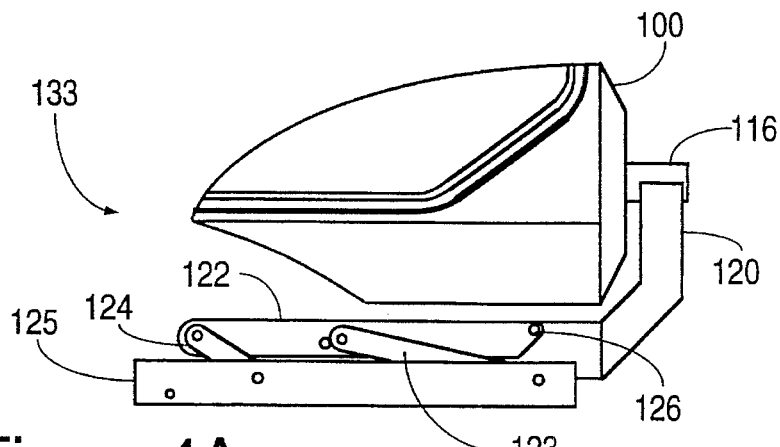
FIGS. 4A–4F illustrate various side views of the motion simulator and capsule.
Figure 4B:
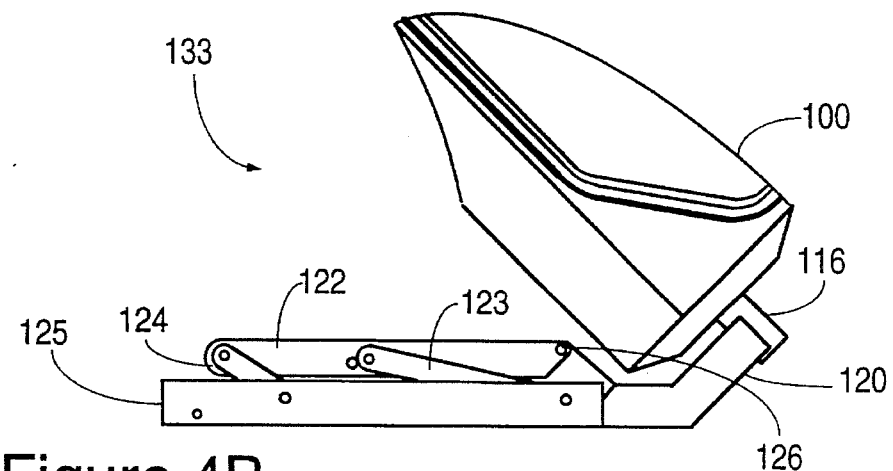
Figure 4C:
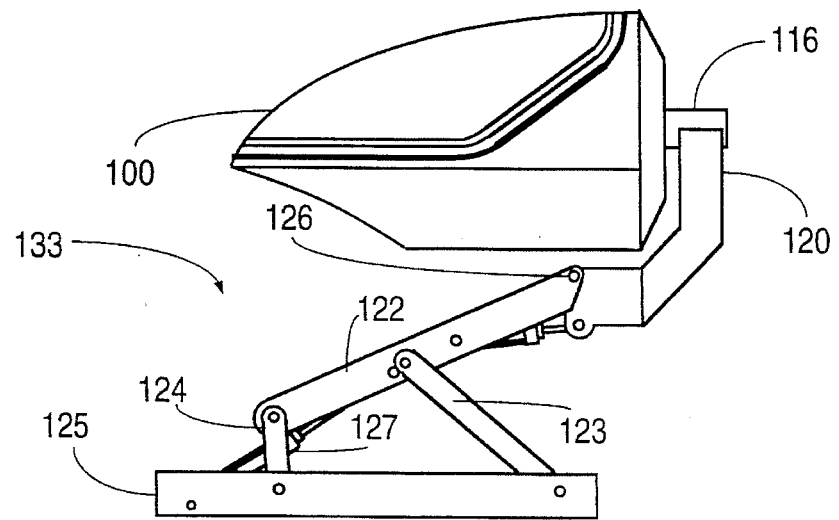
Figure 4D:
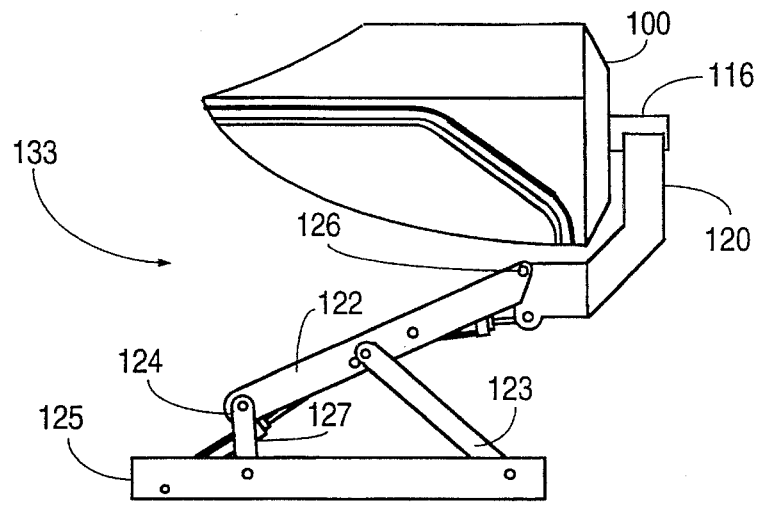
Figure 4E:
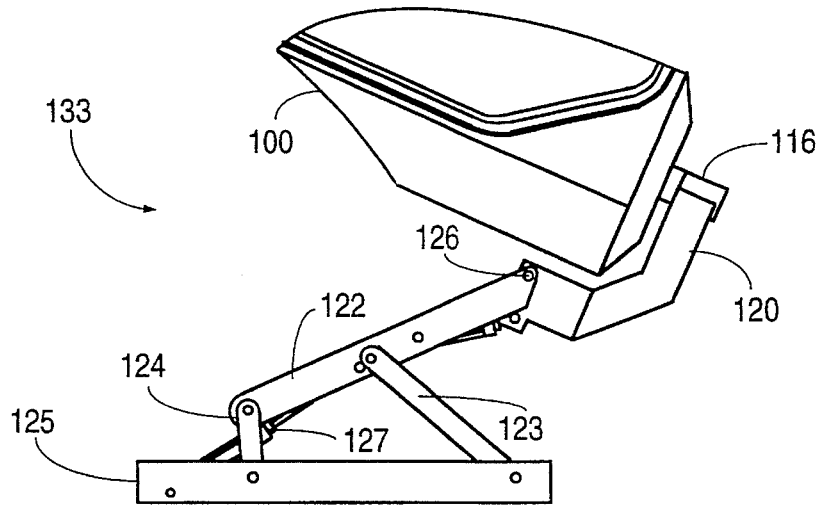
Figure 4F:
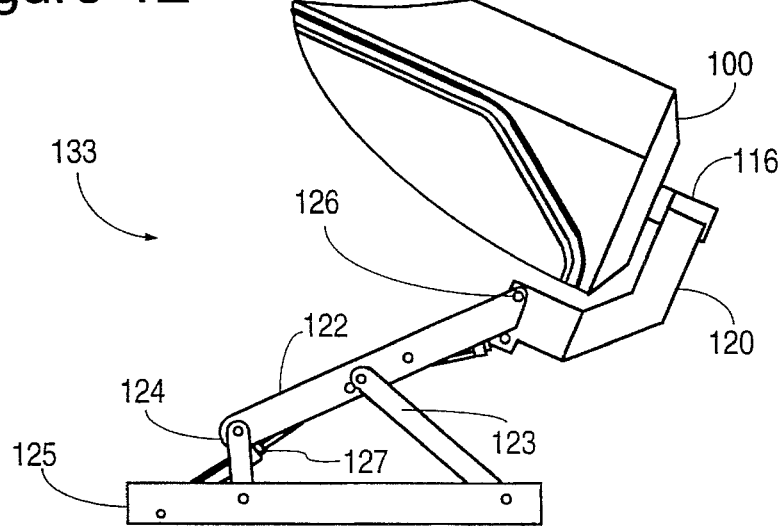

Referring to FIGS. 3A and 3B, which are respectively side and end views of rotational bearing assembly 116 and pitch arm 120, rotation bearing assembly 116 provides full axial rotation, i.e. from 1° to greater than 360° rotation, of capsule 100. Rotation bearing assembly 116 includes an 8 inch (20.32 cm) long hollow shaft 118 fabricated from fatigue proof steel tubing having a 7 ¾ inch (19.685 cm) outside diameter and a one inch (2.54 cm) wall thickness. Shaft 118 is mounted through two bearings 117. In one embodiment, bearings 117 comprise Timken tapered roller bearings, P/N LM739749 cones and LM39710 cups (The Timken Company, 1835 Duber Ave. SW, Canton, Ohio, 44706). Bearings 117 are positioned in a bearing support 119 which is welded to the top end of a pitch arm 120.

Pitch arm 120 comprises three sections: 120A, 120B, and 120C. Section 120A is fabricated from 0.44 inch (1.118 cm) thick steel plate which is machined to accept the housings for bearings 117. Sections 120B and 120C are fabricated from 10 inch (25.4 cm) wide flange by 33 pounds per foot I-Beam. The pitch point section 137 is fabricated from 0.38 inch (0.965 cm) and 0.5 inch (1.27 cm) thick steel plate and houses the pitch pivot tube 138, which is fabricated from a 3 inch (7.62 cm) hot rolled steel bar. Bearings (not shown), for example Bear-N-Bronze bearings, Boston, P/N M2430-16, are pressed into pitch pivot tube 138 along with 1 ½ inch (3.81 cm) hardened and ground steel pitch pivot shaft 153 (see also FIG. 5).

Bearings 117 are mounted back-to-back and preloaded along the axial axis B to limit axial, radial, and angular deflection. The center line distance between bearings 117 is 9.75 inches (24.76 cm). A quadrature encoder 121, mounted on the rear of axial rotation bearing support 119, provides axial position feedback of shaft 118 to the motion control computer 130A (FIG. 2A), wherein motion control computer 130A is any IBM-compatible 486 personal computer.

Capsule 100 is physically rotated by a hydraulic motor 132 having a belt assembly 131 which is coupled to shaft 121. In one embodiment, hydraulic motor 132 is a Parker Hannifin Hydraulics, Inc., low speed high torque motor, P/N 123A-129-HS-1 controlled by a servo valve P/N D1FX-E-04-C, and belt assembly 131 includes HTD sprockets P/N P-144-14M-55-SF and P-144-14M-55-F provided by Woods, Incorp., 440 North 5th Ave., Chambersburg, Pa. 17201, and an HTD belt assembly P/N 2310-14M-55 also provided by Woods, Incorp. Hydraulic motor 132 is activated by motion control computer 130A. In this manner, the present invention provides unlimited axial movement of capsule 100. This unlimited axial movement creates a realistic simulation of, for example, a barrel roll in a roller coaster or a roll over in a fighter plane. Dimensions D3, D4 and D5 of FIG. 3A and dimensions D6 and D7 of FIG. 3B are listed in Table II.

FIGS. 4A–4F show a motion simulator 133 in accordance with the present invention and a capsule 100 in various illustrative positions. Specifically, motion simulator 133 and capsule 100 are shown in six positions in FIGS. 4A–4F: a full down position in FIG. 4A, a down-pitch back position in FIG. 4B, an up-horizontal position in FIG. 4C, an up-inverted position in FIG. 4D, an up-pitch back position in FIG. 4E, and an up-inverted-pitch back position in FIG. 4F. A linear potentiometer (not shown), attached to hydraulic actuator 127, gives direct feedback to motion control computer 130A regarding the extended length of the cylinder of actuator 127. Using this information, motion control computer 130A calculates the vertical positioning of pitch rotation point 126.

Figure 5:
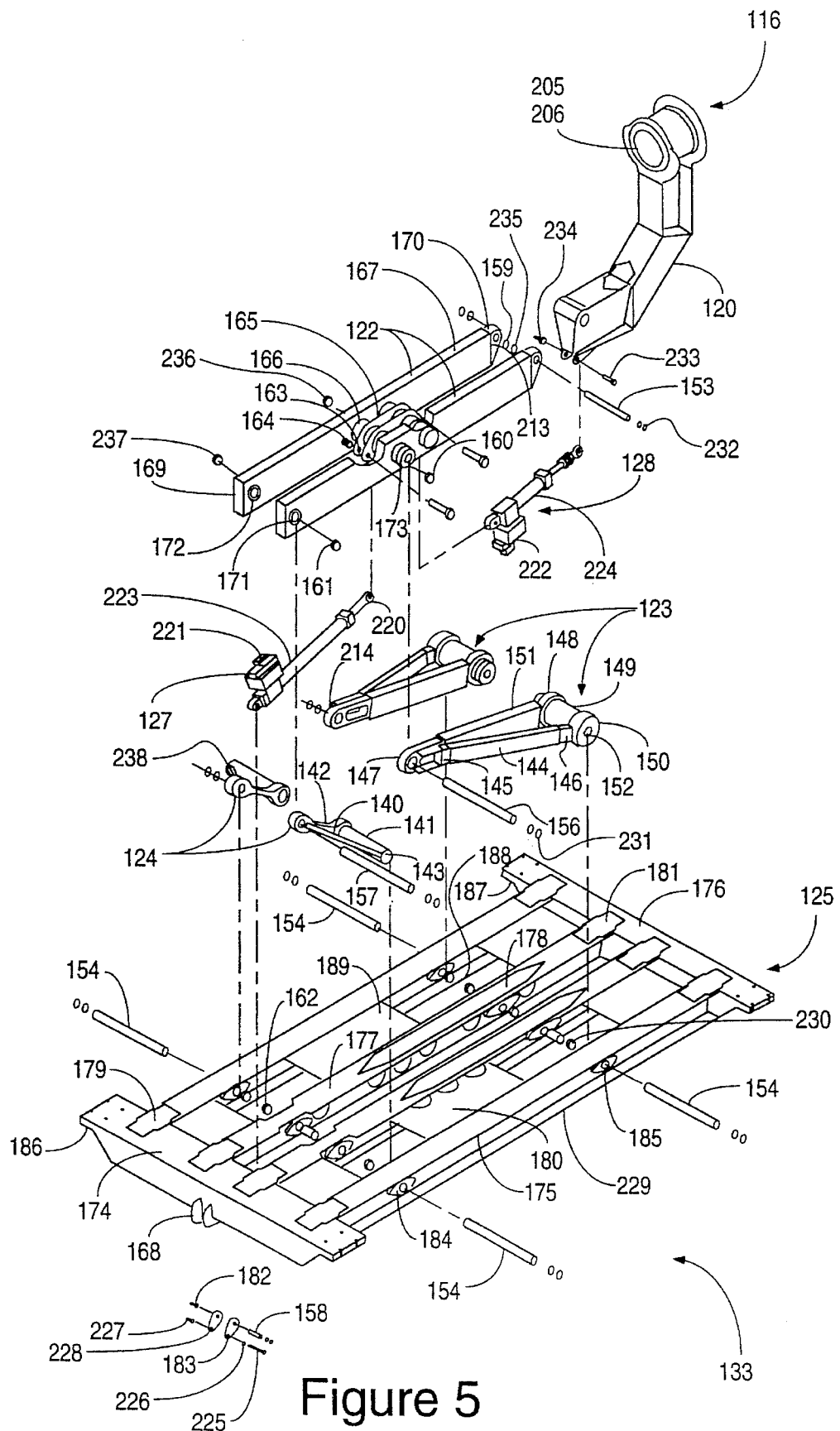
FIG. 5 shows an exploded view of the motion simulator.

FIG. 5 shows an exploded view of motion simulator 133. Referring to FIGS. 4 and 5, the motion simulator 133 comprises a main beam 122, compression members 123, tension members 124, motion platform base 125 (hereinafter the four component assembly), and pitch arm 120. The vertical motion actuator 127 is a 24 inch stroke and 2.5 inch bore, Parker Hydraulics, Inc., series EH hydraulic actuator. As the cylinder of actuator 127 is extended, this cylinder pushes main beam 122 up with guiding support by compression members 123 and tension members 124, thereby providing substantially vertical motion of main beam 122 at the pitch rotation point 126 (explained in detail in reference to FIG. 9). A parts list corresponding to FIGS. 3 and 5 is shown in Table I.

Figure 7:
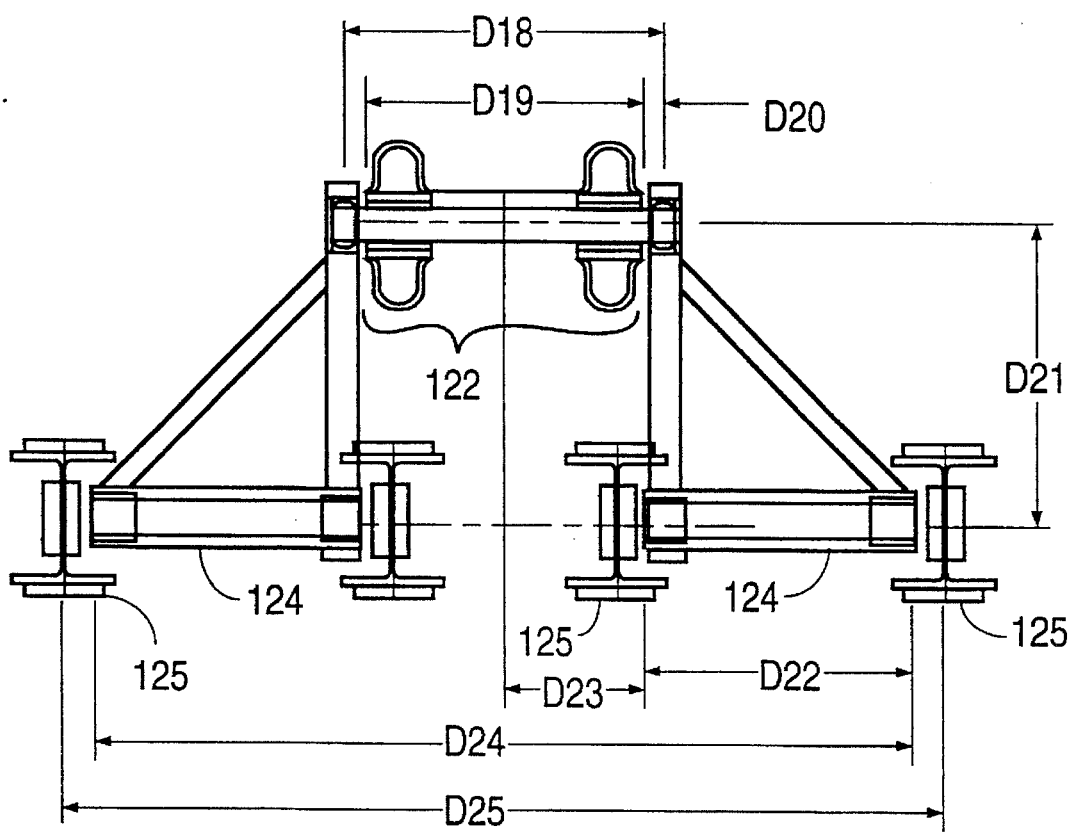
FIG. 7 shows a cross-sectional view of the tension members in the motion simulator.
Figure 8:
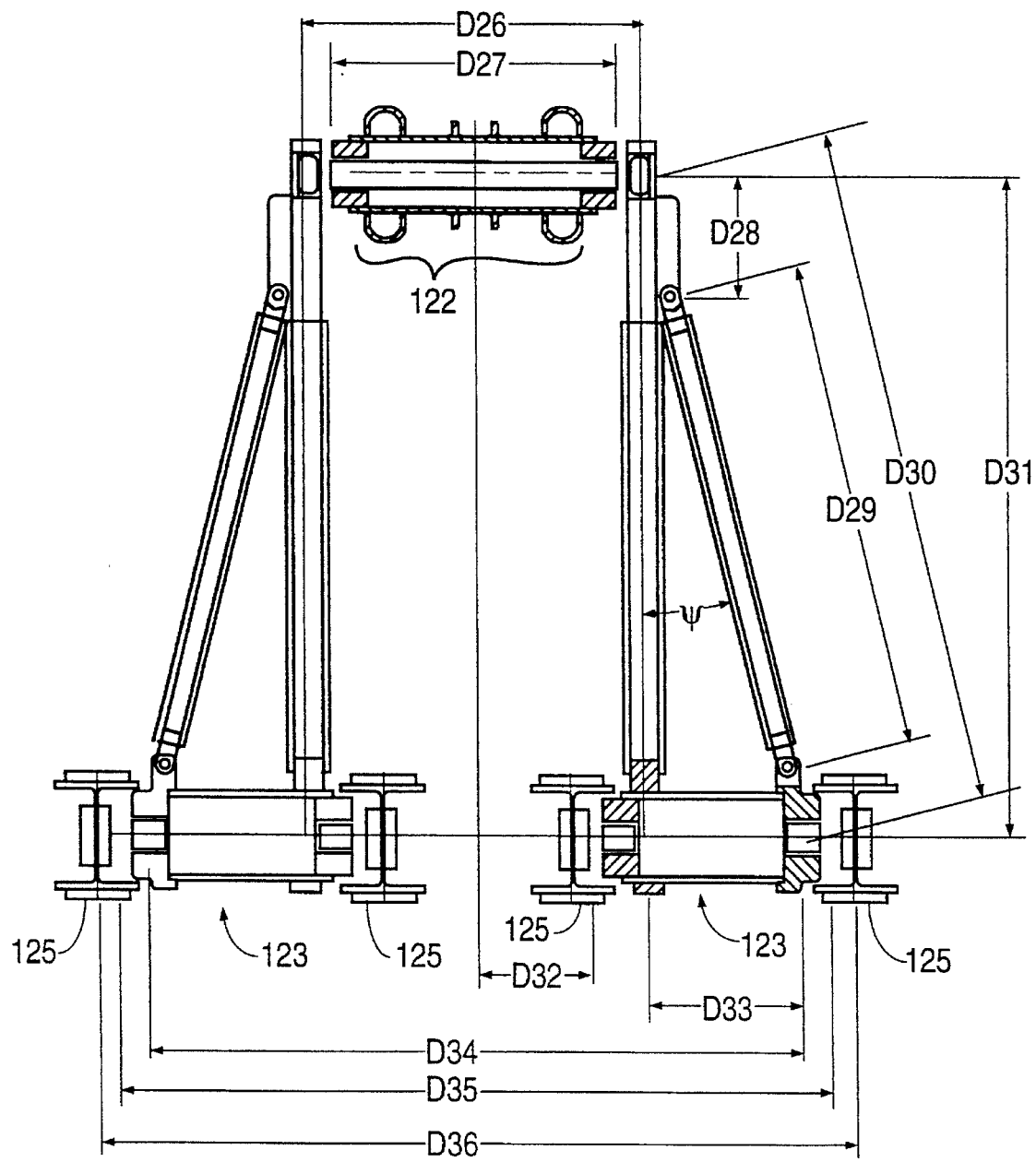
FIG. 8 illustrates a cross-sectional view of the compression members in the motion simulator.

FIGS. 6A, 6B and 6C illustrate a top view, a side view, and an end view, respectively, of main beam 122. In one embodiment, main beam 122 is constructed of 3 inch (7.62 cm) wide by 10 inch (25.4 cm) high, ASTMA 500, rectangular steel structural tubing. The cross tubes 166 are 5 inch (12.7 cm) schedule 80 pipes. The bearing surfaces 172 are Bear-N-Bronz Boston P/N M3240-20. Bearing surfaces 172 are commercially available from Boston Gear International, Inc., 14 Hayward Street, Quincy, Mass. 02171. The dimensions of FIG. 6A, 6B and 6C are listed in Table II. FIG. 7 shows a cross-sectional view of main beam 122, tension members 124, and platform 125 as assembled in accordance with the present invention. FIG. 8 shows a cross-sectional view of main beam 122, compression members 123, and platform 125 as assembled in accordance with the present invention. The dimensions of FIGS. 7 and 8 are listed in Table II. In one embodiment of the present invention, compression members 123 and tension members 124 are interconnected to main beam 122 using Torrington spherical bearings P/N 20SF32 and a 2 inch (5.08 cm) diameter Jorgensen Steel, Fatigue Proof, steel shaft. Compression member 123 and tension members 124 are interconnected to platform 125 using Bear-N-Bronz bearings, Boston P/N M3240-20 that are pressed into each of the lower pivot points and a 2 inch (5.08 cm) diameter Jorgensen Steel, Fatigue Proof, steel shaft.

The four component assembly described in reference to FIGS. 4 and 5 satisfies three important criteria. First, a linear relationship is established between the extension of hydraulic actuator 127 and the vertical motion at pitch rotation point 126. In one embodiment described in detail below, the four component assembly provides a vertical velocity at pitch rotation point 126 which is about double the velocity of actuator 127, thereby almost doubling the potential velocity of capsule 100 in comparison with prior art simulators. Moreover, a linear relationship between the vertical motion actuator 127 and the motion at pitch point 126 optimizes the selection of cylinder sizing and hydraulic line pressure. The cylinder of hydraulic actuator 127 has a piston diameter of 2 ½ inches (6.35 cm). The line pressure, typically about 2,500 psi, yields a maximum cylinder force of 12,250 pounds. The resulting energy available is 2,500 inch-pounds per cubic inch of fluid. In a conventional, i.e. non-linear, system configuration, the required force of the cylinder differs as the cylinder is extended. Because the cylinder must be sized for the worst case condition, the cylinder is therefore oversized for other positions along the stroke. The excess energy that is available is lost in the pressure drop across the servo valve of the cylinder. This pressure drop represents energy lost in the form of heat from the system.

In accordance with the present invention which provides a linear relationship between the velocity of actuator 127 and the velocity of pitch rotation point 126, the cylinder of actuator 127 minimizes energy losses across the servo valve because the energy per inch of motion is independent of stroke position. This same relationship optimizes the hydraulic accumulator sizing because the peak flow rates needed to drive the cylinder are not dependent on the vertical positioning. It logically follows that the force to accelerate capsule 100 vertically is also not dependent on the vertical positioning.

Second, motion simulator 133, in the full down position, has a side profile (see FIG. 4B) of approximately 24 inches (60.96 cm) high, thereby allowing motion simulator 133 to be easily hidden using a raised floor. This raised floor provides access to capsule 100 in one embodiment. If a raised floor is unavailable, access to capsule 100 is accomplished using three, 8 inch (20.32 cm) steps, or a handicap access ramp. Note that motion simulator 133 and capsule 100 have a maximum height within the constraints of a typical 15 foot ceiling.

Figure 9:
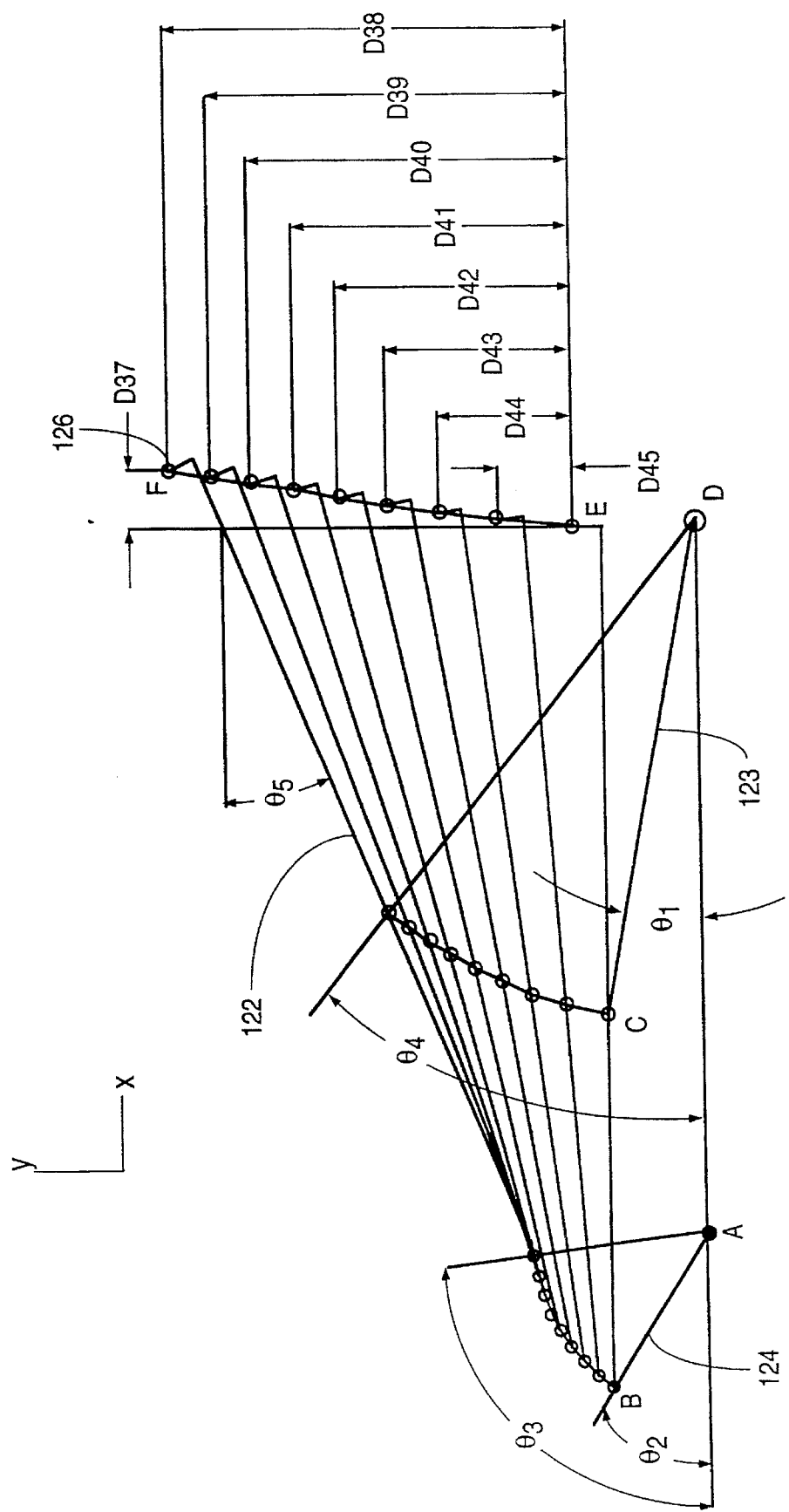
FIG. 9 shows the kinematic relations of the motion simulator and the vertical motion path of the pitch point.

Third, the present invention provides approximately 40 inches of substantially vertical motion at pitch rotation point 126. FIG. 9 illustrates the movement of main beam 122 through various angles of tension members 124 and compression members 123. As shown in FIG. 9, over a vertical distance D38 of 39.747 inches (100.957 cm), pitch point 126 deviates only by the distance D37 of 5.6 inches (14.224 cm) from the vertical axis y. Thus, the present invention provides substantially vertical motion of capsule 100 (not shown). The dimensions of FIG. 9 are listed in Table II.

In one embodiment of the present invention, after the passenger is secured inside capsule 100, capsule 100 is raised 6.0 inches (15.24 cm), thereby establishing a new zero point for vertical motion. This new zero point is established for ride simulations in which the passenger has control of the motion of capsule 100, i.e. in contrast to motion control computer 130A, thereby providing a margin of safety for the passenger irrespective of the motion desired by the passenger. In other words, some motions desired by the passenger may result in capsule 100 passing below the zero point. Thus, the 6.0 inches (15.24 cm) provides a safety cushion for the passenger. In other embodiments of the present invention, for example, in which motion control computer 130A is provided with information regarding the simulated ride, the original zero point (i.e. without the 6.0 inches of vertical motion) is maintained. Assuming a new zero point is established, capsule 100 is allowed to move 32 inches (81.28 cm) vertically, while allowing a safety area of 2 inches at the top of the stroke.

The maximum velocity of actuator 127 (FIG. 5) is determined by the allowable flow rate through the servo control valve used. In the embodiment described in detail above, a Parker Hydraulics, Inc., BD30 servo control valve provides a velocity of approximately 23.7 inches (60.198 cm) per second. Because the cylinder piston has an area of 4.9 inches and a velocity of 23.7 inches per second, the flow rate is 116.13 inches$^3$ per second.

In accordance with the present invention, the four component assembly (which includes main beam 122, compression members 123, tension members 124, and motion platform base 125) provides a vertical velocity of capsule 100 which is 1.9 times the actuator velocity (23.7 inches per second×1.9) or 45.03 inches (114.376 cm) per second. Capsule 100 requires an acceleration of 1.5 Gs and a distance of 6 inches (15.24 cm) of vertical travel to attain this vertical velocity.

Motion simulator 133 also provides sufficient vertical motion to create a feeling of weightlessness. This distance of vertical motion is determined by the flow rate of the system which provides the maximum possible vertical velocity. In one embodiment of the present invention, this distance is approximately 12 inches (explained in detail below). In another embodiment of the present invention, this distance is increased to 40 inches to provide a safety factor.

To simulate this feeling of weightlessness, one embodiment of the present invention provides the following motion profile of capsule 100. First, the maximum vertical velocity as described in detail above is achieved. Second, capsule 100 is decelerated at a rate of 0.5 Gs. The total time for capsule 100 to attain zero vertical velocity is 0.25 seconds and the total distance travelled is 5.7 inches (14.478 cm). Third, during the next 0.25 seconds, capsule 100 is dropped the same 5.7 inches (14.478 cm) at about 0.5 Gs to again attain the maximum vertical velocity of 45.2 inches (14.808 cm) per second. Finally, capsule 100 is decelerated at a rate of 1.5 Gs for 6.0 inches (15.24 cm) During the second and third steps of this motion profile, the passenger experiences the feeling of zero Gs for ½ second. To prevent motion sickness of the passenger, vertical Gs are limited to no less than 0.5 Gs.

Motion control computer 130 monitors the position of capsule 100 along the vertical axis by receiving feedback signals from a Parker Hydraulics, Inc. type CLP linear potentiometer (not shown) coupled to hydraulic actuator 127.

In one embodiment of the present invention, simulator capsule 100 has a total of 70 degrees of pitch motion at pitch rotation point 126. The pitch motion is provided using a 2.5 inch (6.35 cm) bore and 10 inch (25.4 cm) stroke Parker Hydraulics, Inc. series EH hydraulic actuator 128. Pitch rotation point 126 is located directly below the passenger, i.e. seat 102, so that low amplitude pitch actuation of less than plus or minus 4 inches (10.16 cm) can be used in the simulation of forward and backward motion. This simulated forward and backward motion is used in a saw-tooth velocity profile to create the feeling of a sudden stop or a high acceleration, for example.

In one embodiment of the present invention, the forward acceleration of the passenger is limited to 0.12 seconds at 0.5 Gs and moves the passenger forward 1.3 inches (3.302 cm) in seat 102. The ratio of motion between the head of the passenger and pitch actuator 128 is 3.9. Thus, pitch actuator 128 moves a mere 0.33 inches (0.838 cm) during this forward acceleration. The maximum velocity reached by the passenger is approximately 23.0 inches (58.42 cm) per second. Note that the maximum velocity of actuator 128 is 5.9 inches (14.086 cm) per second. The passenger is then decelerated at 0.25 Gs during 0.24 seconds while continuing to move forward 2.7 inches (6.858 cm). The process is then reversed by first accelerating the passenger back at 0.25 Gs for 0.24 seconds and then decelerating at 0.5 Gs for 0.12 seconds. This motion profile, repeated at a rate of 1.4 cycles per second, effectively simulates the feeling of suddenly stopping.

In another embodiment of the present invention, the frequency of oscillation is increased to a rate of 10 to 20 cycles per second, accompanied by a decrease in the change of amplitude of tilt at pitch rotation point 126. If the passenger is initially tilted back during this new motion profile, the feeling of acceleration is simulated. For example, if the passenger is pitched back to 40 degrees during this motion profile, the acceleration G forces of a jet fighter, such as the Blue Angel, in a climb out maneuver are simulated. If the passenger is shown visual images that indicate that capsule 100 is level, a feeling of high acceleration, such as the acceleration felt racing in a Ferrari, is simulated.

The 70 degrees of total range of pitch motion provided by the present invention creates additional desirable and exciting sensations. For example, if the passenger is quickly rotated from a full pitched back position to a full pitch forward position, the feeling of flying or dropping straight down is simulated.

The motion simulator further provides the passenger with a 0.5 Gs pitch forward, a 0.25 Gs pitch backward, 0.25 GS rotational acceleration, and 2.25 Gs vertical acceleration. The gravitational forces associated with the rotational and vertical acceleration are provided substantially with the pitch of the capsule. For example, the motion simulator provides 1.25 Gs during vertical acceleration. The remaining 1.0 G is provided by gravity. The above-described gravitational forces simulate the motions associated with such rides as high speed looping roller coasters, bobsled rides, water rides, flying rides, and driving rides.

Note that the passenger as well as projector 109 are located along the center line of rotation at pitch rotation point 126. However, because the passenger is located further out along the center line, the passenger experiences significantly more gravitational forces than does projector 109. Thus, the present invention simultaneously enhances the motions experienced by the passenger while minimizing any motion to projector 109.

This description is illustrative only and not limiting. Those skilled in the art will be able to devise other simulators within the scope of the detailed description and the accompanying drawings. The present invention is set forth in the appended claims.

TABLE I

| | | |
|---|---|---|
| 18 inch link arm assembly | | |
| 140 | Knee Brace | 1" by 1" hot rolled Steel |
| 141 | Lower Bearing Housing | 3.5" O.D. by .63" wall steel tube |
| 142 | Dog Bone | 2.25" thick hot rolled steel plate |
| 143 | Bear-N-Bronze Bearing | Boston P/N M3240-20 |
| 50 inch compression member assembly | | |
| 144 | Knee Member | 2" by 4" by .312" wall steel tube |
| 145 | Knee Attachment Block | Hot rolled steel |
| 146 | Knee Brace Anchor | ½" thick hot rolled steel |

TABLE I-continued

| | | |
|---|---|---|
| 147 | Upper Pivot | 2.25" thick hot rolled steel |
| 148 | Lower Pivot | 3.25" thick hot rolled steel |
| 149 | Tube | 6" schedule 80 steel pipe |
| 150 | Lower tube attachment | 2.25" thick hot rolled steel plate |
| 151 | Main Member | 3" by 6" by .375 wall steel tube |
| 152 | Bear-N-Bronze Bearing | Boston P/N M3240-20 |
| Shafts and Bushings | | |
| 153 | Shaft, Pitch Pivot | 1½" Hardened and Ground Steel |
| 154 | Shaft, Base | 2" Hardened and Ground Steel |
| 155 | Shaft, Main Beam, 18 inch link | 2" Hardened and Ground Steel |
| 156 | Shaft, Main Beam, 50 inch member | 2" Hardened and Ground Steel |
| 157 | Shaft, 18 inch link arm weldment | ¾" mild steel |
| 158 | Shaft, main cylinder mount | 1¼" Hardened and Ground Steel |
| 159 | Spacer, Pitch Pivot | Bearing Bronze |
| 160 | spacer, 50" member | Bearing Bronze |
| 161 | Spacer, 18" Link | Bearing Bronze |
| 162 | Spacer, Base Shafts | Bearing Bronze |
| 163 | Spacer, cylinder attachment | Steel |
| 164 | Washer, cylinder attachment | Steel |
| Main Beam Weldment | | |
| 165 | Pitch Pivot Block | 2.5" thick hot rolled steel plate |
| 166 | Cross Tube | 5" schedule 80 steel pipe |
| 167 | Main Beam | 3" by 10" by .25" steel tube |
| 168 | Cylinder Clevis | .5" thick hot rolled steel plate |
| 169 | End Plate | .25" thick hot rolled steel plate |
| 170 | Main Pivot | Hot rolled steel |
| 171 | Forward Pivot | 4" steel rod |
| 172 | Bear-N-Bronze Bearing | Boston P/N M3240-32 |
| 173 | Bear-N-Bronze Bearing | Boston P/N M3240-20 |
| Base Weldment | | |
| 174 | Forward Beam | 8" by 12" by .375" wall steel tube |
| 175 | Outboard Beam | 8" wide flange by 28# per foot steel |
| 176 | Aft Beam | 8" by 8" by .375" wall steel tube |
| 177 | Inboard Beam | 8" wide flange by 28# per foot steel |
| 178 | Stiffener | .63" by .5" steel bar |
| 179 | Forward Beam Link | .63" by 6.5" steel bar |
| 180 | Shear step plate | .63" by 2.25" steel bar |
| 181 | Aft Beam Link | .63" by 6.5" steel bar |
| 182 | Cylinder shaft retainer | .38" thick steel plate |
| 183 | Cylinder Mount | .75" thick steel plate |
| 184 | Pivot Mount, 18" link | 2.25" thick steel plate |
| 185 | Pivot Mount, 50" member | 2.25" thick steel plate |
| 186 | Forward Caster Mounting Plate | .5" by 4.5" steel bar |
| 187 | Aft Caster Mounting Plate | .5" by 4.5" steel bar |
| 188 | Shear Plate | .19" thick steel plate |
| 189 | Shear Plate, Notched | .19" thick steel plate |
| Pitch Arm Weldment | | |
| 119 | Bearing Housing | 3" thick steel plate |
| 120A | Vertical Beam | 10" wide flange by 33# per foot steel |
| 120B | 45 degree Beam | 10" wide flange by 33# per foot steel |
| 193 | Forward Ear | .44" thick steel plate |
| 194 | Aft Ear | .44" thick steel plate |
| 195 | Tube, Pitch Arm | .19" thick steel plate |
| 196 | Upper shear plate | .25" thick plate |
| 197 | Lower shear plate | .25" thick plate |
| 198 | Doubler angle | .38" thick steel plate |
| 199 | Cylinder clekis | .5" thick steel plate |
| 200 | Bottom Plate | .38" thick steel plate |
| 201 | Side Plate | .50" thick steel plate |
| 138 | Pitch pivot tube | 3" hot rolled steel bar |
| 203 | Top Plate | .38" steel plate |
| 204 | Bear-N-Bronze Bearing | Boston P/N M3240-16 |
| 205 | Tapered Roller Cone | Timken P/N LM739749 |
| 206 | Tapered Roller Cup | Timken P/N LM739710 |
| 132 | High Torque Motor, P/N 123A-129-HS-1 | Parker Hannifin Hydraulics, Inc. |
| 209 | Rotational Shaft, 7.75" diameter | 8" O.D. by 1.0" wall steel tube |
| 210 | HTD Sprocket | Woods, P/N P-40-14M-55-SF |
| 211 | SF by 1¼" bushing | Woods, P/N SFX-L 1/4 |
| 212 | HTD Sprocket | Woods, P/N P-144-14M-55-F |
| 131 | HTD Belt | Woods, P/N 2310-14M-55 |
| Bearings and Misc. Hardware | | |
| 213 | Spherical Bearing | Torrington, P/N 15SF24 |
| 214 | Spherical Bearing | Torrington, P/N 20SF32 |
| 220 | Rod End, 1.25" Dia. w/ Grease fitting | Baker Bearing, P/N KW-20-1, 1¼-12 Female Thread |
| 221 | BD-15-A-A-E-N-B-20 20 GPM Servo Valve | Parker Hannifin Hydraulics, Inc. |
| 222 | BD-15-A-A-E-N-B-10 10 GPM Servo Valve | Parker Hannifin Hydraulics, Inc. |
| 223 | 2½"-SB-EH-L-T-S-2-4-24" S= 2" stop tube, 22" net stroke Special Spherical Bearing per drawing, No Feedback, BD-15 mounting pad, A=2.5". | Parker Hannifin Hydraulics, Inc. |
| 224 | 2½"-SB-EH-L-T-S-2-4-10" S=Special Spherical Bearing per drawing, No Feedback, BD-15 mounting pad, A=2.5". | Parker Hannifin Hydraulics, Inc. |
| 225 | ½-13 Hex Head Bolt × 6 in. long, grade 5 | |
| 226 | ½ in. Flat Washer | |
| 227 | ½-13 Hex Nut, Lock and Flat Washer | |
| 228 | Cylinder Shaft Retainer FIN Base 83 | |
| 229 | Base Weldment FIN Bases 1-4 | |
| 230 | Base Shaft Spacer | |
| 231 | Ext. Retaining Ring P/N 5100-200 | |
| 232 | Ext. Retaining Ring P/N 5100-150 | |
| 233 | 1.25" Shoulder Bolt × 3.50" Long | |
| 234 | Cylinder Attachment Washer FIN Shafspac ⅞-9 Hex Nut, Lock and Flat Washer | |
| 235 | Pitch Pivot Spacer FIN Shafspac | |
| 236 | 50" Comp/Main Beam Spacer FIN Shafspac | |
| 237 | 10" Link/Main Beam Spacer FIN Shafspac | |
| 238 | 10" Link Arm FIN Shafspac | |

TABLE II

| | |
|---|---|
| D1 | 107.25" |
| D2 | 58.5" |
| D3 | 12.56" |
| D4 | 0.564" |
| D5 | 2.506" |
| D6 | 8.0" |
| D7 | 2.5" |
| D8 | 2.75" |
| D9 | 36.0" |
| D10 | 9.08" |
| D11 | 38.92" |
| D12 | 4.375" |
| D13 | 2.5" |
| D14 | 84.5" |
| D15 | 89.25" |
| D16 | 10.5" |
| D17 | 2.5" |
| D18 | 20.5" |
| D19 | 17.5" |
| D20 | 1.5" |
| D21 | 18.0" |
| D22 | 16.75" |
| D23 | 9.0" |

TABLE II-continued

| | |
|---|---|
| D24 | 51.5" |
| D25 | 55.5" |
| D26 | 25.0" |
| D27 | 21.25" |
| D28 | 9.0" |
| D29 | 36.986" |
| D30 | 51.420" |
| D31 | 50.0" |
| D32 | 9.0" |
| D33 | 12.0" |
| D34 | 49.0" |
| D35 | 51.5" |
| D36 | 55.5" |
| D37 | 5.6" |
| D38 | 39.747" |
| D39 | 35.6965" |
| D40 | 31.6149" |
| D41 | 27.4541" |
| D42 | 23.1209" |
| D43 | 18.5055" |
| D44 | 13.4331" |
| D45 | 7.3902" |
| $\phi$ | 12.14° |
| $\delta$ | 18.3° |
| $\Psi$ | 13.4957° |
| $\theta_1$ | 11.5370° |
| $\theta_2$ | 33.749 |
| $\theta_3$ | 83.7° |
| $\theta_4$ | 39.6° |
| $\theta_5$ | 22.4° |
| AB | 18.0" |
| BC | 36.0" |
| CD | 50.0" |
| CE | 48.0" |
| AD | 70.03" |
| EF | 2.5". |

I claim:

1. A device to provide motion to a capsule comprising:
a platform;
an arm for elevating said capsule above said platform, said capsule being supported on only one end by said arm, wherein said arm includes a first section and a second section, said first section for providing substantially vertical motion to said capsule and said second section for providing pitch to said capsule; and
means for rotating said capsule about a roll axis by at least 360 degrees on said arm.

2. The device of claim 1 wherein said means for rotating comprises a rotation bearing assembly.

3. The device of claim 2 wherein said rotation bearing assembly includes:
a shaft coupled to said capsule;
a structure for positioning said shaft in operative relation to said arm; and
means for providing slipping between said shaft and said structure.

4. The device of claim 3 wherein said means for providing slipping comprises at least one bearing.

5. The device of claim 3 wherein said means for providing slipping comprises two, angular contact bearings.

6. The device of claim 3 wherein said first section comprises:
a beam rotatably coupled to said second section; and
means for providing substantially vertical motion of said capsule by elevating said beam.

7. A simulation system comprising:
a capsule;
a base;
an arm for elevating said capsule above said base, said capsule being supported only on one end by said arm, wherein said arm includes a first section and a second section said first section for providing vertical motion to said capsule and said second section for providing pitch movement to said capsule;
a mechanism for rotating said capsule about a roll axis by at least 360 degrees on said arm; and
means for providing visual and audio signals to said capsule.

8. The simulation system of claim 7 wherein said mechanism for rotating includes:
a shaft coupled to said capsule;
means for positioning said shaft on said arm;
a belt assembly coupled to said shaft;
a motor for turning said belt assembly; and
means for providing slipping between said shaft and said means for positioning.

9. The simulation system of claim 8 wherein said fast section comprises:
a beam rotatably coupled to said second section; and
means for providing substantially vertical motion of said capsule by elevating said beam.

* * * * *